US008903794B2

(12) United States Patent
Vadlamani et al.

(10) Patent No.: US 8,903,794 B2
(45) Date of Patent: Dec. 2, 2014

(54) GENERATING AND PRESENTING LATERAL CONCEPTS

(75) Inventors: Viswanath Vadlamani, Redmond, WA (US); Munirathnam Srikanth, Redmond, WA (US); Phani Vaddadi, Issaquah, WA (US); Abhinai Srivastava, Seattle, WA (US); Tarek Najm, Kirkland, WA (US); Rajeev Prasad, Bothell, WA (US); Arungunram Chandrasekaran Surendran, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 36 days.

(21) Appl. No.: 12/700,980

(22) Filed: Feb. 5, 2010

(65) Prior Publication Data
US 2011/0196851 A1 Aug. 11, 2011

(51) Int. Cl.
G06F 17/00 (2006.01)
G06F 7/00 (2006.01)
G06F 17/30 (2006.01)

(52) U.S. Cl.
CPC .... G06F 17/30672 (2013.01); G06F 17/30867 (2013.01)
USPC .......................................... 707/706; 707/722

(58) Field of Classification Search
USPC ................................................. 707/706, 722
See application file for complete search history.

(56) References Cited

U.S. PATENT DOCUMENTS

| | | | |
|---|---|---|---|
| 5,748,974 A | 5/1998 | Johnson | |
| 5,835,087 A | 11/1998 | Herz et al. | |
| 6,038,560 A * | 3/2000 | Wical | 707/999.005 |
| 6,154,213 A | 11/2000 | Rennison et al. | |
| 6,256,031 B1 | 7/2001 | Meijer et al. | |
| 6,363,378 B1 | 3/2002 | Conklin et al. | |
| 6,460,034 B1 | 10/2002 | Wical | |
| 6,510,406 B1 | 1/2003 | Marchisio | |
| 6,556,983 B1 | 4/2003 | Altschuler et al. | |
| 6,675,159 B1 * | 1/2004 | Lin et al. | 707/E17.09 |
| 6,681,218 B1 | 1/2004 | Zou | |
| 6,859,800 B1 | 2/2005 | Roche | |
| 6,868,525 B1 | 3/2005 | Szabo | |
| 6,968,332 B1 | 11/2005 | Milic-Frayling et al. | |

(Continued)

FOREIGN PATENT DOCUMENTS

| | | |
|---|---|---|
| CN | 1535433 | 10/2004 |
| CN | 101124609 | 2/2008 |

(Continued)

OTHER PUBLICATIONS

International Search Report and Written Opinion in PTC application PCT/US2011/020908 mailed Sep. 28, 2011.

(Continued)

*Primary Examiner* — Pavan Mamillapalli
(74) *Attorney, Agent, or Firm* — Dave Ream; Doug Barker; Micky Minhas (57) ABSTRACT

Systems, methods, and computer-storage media for generating lateral concepts are provided. The system includes a search engine to receive user queries, a storage to store content and its associated categories, and a lateral concept generator. The lateral concept generator is connected to both the search engine and storage. The lateral concept generator selects lateral concepts from categories associated with the content based on similarity scores for the stored content.

20 Claims, 5 Drawing Sheets

(56) References Cited

U.S. PATENT DOCUMENTS

| | | |
|---|---|---|
| 7,085,771 B2 | 8/2006 | Chung et al. |
| 7,089,226 B1 | 8/2006 | Dumais et al. |
| 7,152,031 B1 | 12/2006 | Jenson |
| 7,153,137 B2 | 12/2006 | Altenhofen |
| 7,167,866 B2 | 1/2007 | Farnham |
| 7,171,424 B2 | 1/2007 | Barsness et al. |
| 7,213,205 B1* | 5/2007 | Miwa et al. ............ 707/999.005 |
| 7,225,407 B2 | 5/2007 | Sommerer |
| 7,275,061 B1* | 9/2007 | Kon et al. ............ 707/999.101 |
| 7,292,243 B1 | 11/2007 | Burke |
| 7,319,998 B2* | 1/2008 | Marum Campos et al. .... 706/45 |
| 7,350,138 B1 | 3/2008 | Swaminathan et al. |
| 7,421,450 B1 | 9/2008 | Mazzarella et al. |
| 7,448,047 B2 | 11/2008 | Poole |
| 7,496,830 B2 | 2/2009 | Rubin |
| 7,505,985 B2 | 3/2009 | Kilroy |
| 7,565,627 B2 | 7/2009 | Brill |
| 7,577,646 B2 | 8/2009 | Chien |
| 7,636,779 B2 | 12/2009 | Hayashi et al. |
| 7,657,518 B2 | 2/2010 | Budzik et al. |
| 7,676,485 B2 | 3/2010 | Elfayoumy et al. |
| 7,694,212 B2 | 4/2010 | Fikes et al. |
| 7,707,201 B2* | 4/2010 | Kapur et al. ................ 707/706 |
| 7,743,360 B2 | 6/2010 | Venolia |
| 7,809,705 B2 | 10/2010 | Dom et al. |
| 7,809,717 B1* | 10/2010 | Hoeber et al. ................ 707/722 |
| 7,818,315 B2 | 10/2010 | Cucerzan et al. |
| 7,849,080 B2 | 12/2010 | Chang et al. |
| 7,860,853 B2 | 12/2010 | Ren et al. |
| 7,870,117 B1 | 1/2011 | Rennison |
| 7,921,107 B2 | 4/2011 | Chang et al. |
| 7,921,108 B2 | 4/2011 | Wang et al. |
| 7,921,109 B2 | 4/2011 | Parikh et al. |
| 7,934,161 B1 | 4/2011 | Denise |
| 7,937,340 B2 | 5/2011 | Hurst-Hiller et al. |
| 7,958,115 B2 | 6/2011 | Kraft |
| 7,966,305 B2 | 6/2011 | Olsen et al. |
| 7,970,721 B2 | 6/2011 | Leskovec et al. |
| 8,015,006 B2 | 9/2011 | Kennewick et al. |
| 8,024,329 B1 | 9/2011 | Rennison |
| 8,051,104 B2* | 11/2011 | Weissman et al. ............ 707/796 |
| 8,086,600 B2 | 12/2011 | Bailey et al. |
| 8,090,713 B2 | 1/2012 | Tong et al. |
| 8,090,724 B1 | 1/2012 | Welch et al. |
| 8,108,385 B2 | 1/2012 | Kraft et al. |
| 8,122,016 B1 | 2/2012 | Lamba et al. |
| 8,122,017 B1 | 2/2012 | Sung et al. |
| 8,126,880 B2 | 2/2012 | Dexter et al. |
| 8,150,859 B2 | 4/2012 | Vadlamani et al. |
| 8,176,041 B1 | 5/2012 | Harinarayan et al. |
| 8,229,900 B2 | 7/2012 | Houle |
| 8,260,664 B2* | 9/2012 | Vadlamani et al. ........ 705/14.49 |
| 8,326,842 B2 | 12/2012 | Vadlamani et al. |
| 8,386,509 B1 | 2/2013 | Scofield et al. |
| 8,447,760 B1 | 5/2013 | Tong et al. |
| 8,706,709 B2 | 4/2014 | Ahuja et al. |
| 2002/0049738 A1 | 4/2002 | Epstein |
| 2002/0062368 A1 | 5/2002 | Holtzman et al. |
| 2003/0078913 A1 | 4/2003 | McGreevy |
| 2003/0177112 A1* | 9/2003 | Gardner ............................ 707/3 |
| 2004/0003351 A1 | 1/2004 | Sommerer |
| 2004/0015483 A1 | 1/2004 | Hogan |
| 2004/0030741 A1 | 2/2004 | Wolton |
| 2004/0169688 A1 | 9/2004 | Burdick |
| 2005/0022114 A1 | 1/2005 | Shanahan et al. |
| 2005/0055341 A1 | 3/2005 | Haahr |
| 2005/0080775 A1 | 4/2005 | Colledge |
| 2005/0120015 A1* | 6/2005 | Marum Campos et al. ...... 707/5 |
| 2005/0125219 A1 | 6/2005 | Dymetman et al. |
| 2005/0132297 A1 | 6/2005 | Milic-Frayling |
| 2005/0149510 A1* | 7/2005 | Shafrir .............................. 707/3 |
| 2005/0198011 A1* | 9/2005 | Barsness et al. .................. 707/3 |
| 2005/0203924 A1 | 9/2005 | Rosenberg |
| 2005/0257894 A1 | 11/2005 | Biagiotti |
| 2005/0268341 A1 | 12/2005 | Ross |
| 2006/0004732 A1 | 1/2006 | Odom |
| 2006/0005156 A1 | 1/2006 | Korpipaa |
| 2006/0036408 A1 | 2/2006 | Templier et al. |
| 2006/0047691 A1 | 3/2006 | Humphreys |
| 2006/0069589 A1 | 3/2006 | Nigam et al. |
| 2006/0069617 A1 | 3/2006 | Milener |
| 2006/0074870 A1 | 4/2006 | Brill et al. |
| 2006/0106793 A1 | 5/2006 | Liang |
| 2006/0116994 A1 | 6/2006 | Jonker |
| 2006/0117002 A1 | 6/2006 | Swen |
| 2006/0122979 A1 | 6/2006 | Kapur et al. |
| 2006/0242147 A1 | 10/2006 | Gehrking |
| 2006/0248078 A1 | 11/2006 | Gross et al. |
| 2006/0287919 A1 | 12/2006 | Rubens |
| 2006/0287983 A1 | 12/2006 | Krauss et al. |
| 2007/0011155 A1 | 1/2007 | Sarkar |
| 2007/0011649 A1 | 1/2007 | Venolia |
| 2007/0136246 A1 | 6/2007 | Stenchikova et al. |
| 2007/0150515 A1 | 6/2007 | Brave et al. |
| 2007/0174255 A1 | 7/2007 | Sravanapudi |
| 2007/0226198 A1 | 9/2007 | Kapur |
| 2007/0294200 A1 | 12/2007 | Au |
| 2008/0010311 A1 | 1/2008 | Kon et al. |
| 2008/0033932 A1 | 2/2008 | DeLong |
| 2008/0033982 A1 | 2/2008 | Parikh et al. |
| 2008/0059508 A1 | 3/2008 | Lu et al. |
| 2008/0082477 A1 | 4/2008 | Dominowska et al. |
| 2008/0104061 A1 | 5/2008 | Rezaei |
| 2008/0104071 A1 | 5/2008 | Pragada et al. |
| 2008/0133488 A1 | 6/2008 | Bandaru et al. |
| 2008/0133585 A1 | 6/2008 | Vogel |
| 2008/0208824 A1 | 8/2008 | Curtis et al. |
| 2008/0235203 A1 | 9/2008 | Case et al. |
| 2008/0243799 A1 | 10/2008 | Rozich |
| 2008/0256061 A1 | 10/2008 | Chang |
| 2008/0270384 A1 | 10/2008 | Tak |
| 2008/0288456 A1 | 11/2008 | Omoigui |
| 2008/0313119 A1 | 12/2008 | Leskovec et al. |
| 2009/0006358 A1 | 1/2009 | Morris |
| 2009/0006974 A1 | 1/2009 | Harinarayan |
| 2009/0024962 A1 | 1/2009 | Gotz |
| 2009/0055394 A1 | 2/2009 | Schilit et al. |
| 2009/0083261 A1 | 3/2009 | Nagano |
| 2009/0089312 A1 | 4/2009 | Chi et al. |
| 2009/0100037 A1 | 4/2009 | Scheibe |
| 2009/0119261 A1 | 5/2009 | Ismalon |
| 2009/0119289 A1 | 5/2009 | Gibbs et al. |
| 2009/0125505 A1 | 5/2009 | Bhalotia |
| 2009/0157419 A1 | 6/2009 | Bursey |
| 2009/0157676 A1 | 6/2009 | Shanbhag |
| 2009/0164441 A1 | 6/2009 | Cheyer |
| 2009/0234814 A1 | 9/2009 | Boerries |
| 2009/0240672 A1 | 9/2009 | Costello |
| 2009/0241065 A1 | 9/2009 | Costello |
| 2009/0254574 A1 | 10/2009 | De et al. |
| 2009/0299853 A1 | 12/2009 | Jones et al. |
| 2010/0005092 A1 | 1/2010 | Matson |
| 2010/0010913 A1 | 1/2010 | Pinckney et al. |
| 2010/0023508 A1 | 1/2010 | Zeng |
| 2010/0042619 A1 | 2/2010 | Jones et al. |
| 2010/0070484 A1 | 3/2010 | Kraft et al. |
| 2010/0106485 A1 | 4/2010 | Lu |
| 2010/0131085 A1 | 5/2010 | Steelberg |
| 2010/0138402 A1 | 6/2010 | Burroughs et al. |
| 2010/0223261 A1 | 9/2010 | Sarkar |
| 2010/0332500 A1 | 12/2010 | Pan et al. |
| 2011/0040749 A1 | 2/2011 | Ceri et al. |
| 2011/0047148 A1 | 2/2011 | Omoigui |
| 2011/0047149 A1 | 2/2011 | Vaananen |
| 2011/0055189 A1 | 3/2011 | Effrat et al. |
| 2011/0055207 A1 | 3/2011 | Schorzman et al. |
| 2011/0125734 A1 | 5/2011 | Duboue et al. |
| 2011/0131157 A1 | 6/2011 | Iyer et al. |
| 2011/0131205 A1 | 6/2011 | Iyer et al. |
| 2011/0145232 A1 | 6/2011 | Chang et al. |
| 2011/0179024 A1 | 7/2011 | Stiver et al. |
| 2011/0196737 A1* | 8/2011 | Vadlamani et al. ........ 705/14.49 |
| 2011/0196851 A1 | 8/2011 | Vadlamani et al. |
| 2011/0196852 A1 | 8/2011 | Srikanth et al. |

(56) References Cited

U.S. PATENT DOCUMENTS

| | | | |
|---|---|---|---|
| 2011/0231395 | A1 | 9/2011 | Vadlamani et al. |
| 2011/0264655 | A1 | 10/2011 | Xiao et al. |
| 2011/0264656 | A1 | 10/2011 | Dumais et al. |
| 2011/0307460 | A1 | 12/2011 | Vadlamani et al. |
| 2012/0130999 | A1 | 5/2012 | Jin et al. |

FOREIGN PATENT DOCUMENTS

| | | |
|---|---|---|
| CN | 101137957 | 3/2008 |
| CN | 101356525 | 1/2009 |
| CN | 101364239 A | 2/2009 |
| CN | 101432719 A | 5/2009 |
| JP | 2003032292 A | 2/1991 |
| JP | 2005165958 | 2/1993 |
| JP | 2008235185 | 9/1996 |
| JP | 2009252145 | 10/2009 |
| KR | 100837751 | 6/2008 |
| WO | 0150330 | 12/2001 |
| WO | 2006083684 | 8/2006 |
| WO | 2007143109 | 6/2007 |
| WO | 2007113546 | 10/2007 |
| WO | 2008027503 | 3/2008 |
| WO | 2009117273 A2 | 9/2009 |
| WO | 2010148419 | 12/2010 |

OTHER PUBLICATIONS

"On Scalability of the Similarity Search in the World of Peers"—Published Date: 2006, http://www.nmis.isti.cnr.it/falchi/publications/Falchi-2006-Infoscale.pdf.

"Curse of Dimensionality in the Application of Pivot-based Indexes to the Similarity Search Problem"—Published Date: May 2009, http://arxiv.org/PS_cache/arxiv/pdf/0905/0905.2141v1.pdf.

"Google Wonder Wheel, Google Wonder Wheel Explained", Google Inc., Published Date: 2009, http://www.googlewonderwheel.com/.

"Cuil—Features", Cuil, Inc., Published Date: 2010, http://www.cuil.com/info/features/.

"Kosmix: Your Guide to the Web", Kosmix Corporation, Published Date: 2010, http://www.kosmix.com/corp/about.

Broder, Andrei, et al., A Semantic Approach to Contextual Advertising—Published Date: Jul. 23-27, 2007 http://fontoura.org/papers/semsyn.pdf.

Osinski, Stanislaw, An Algorithm for Clustering of Web Search Results—Published Date: Jun. 2003 http://project.carrot2.org/publications/osinski-2003-lingo.pdf.

Rajaraman, Anand, Kosmix: Exploring the Deep Web using Taxonomies and Categorization—Published Date: 2009. ftp://ftp.research.microsoft.com/pub/debull/A09June/anand_deepweb1.pdf.

Wang, Xuerui, et al., A Search-based Method for Forecasting Ad Impression in Contextual Advertising—Published Date: Apr. 20-24, 2009 http://www.cs.umass.edu/~xuerui/papers/forecasting_www2009.pdf.

Wartena, Christian, et al., Topic Detection by Clustering Keywords—Published Date: Sep. 5, 2008 http://www.uni-weimar.de/medien/webis/research/workshopseries/tir-08/proceedings/18_paper_655.pdf.

Chirita, Paul-Alexandru, et al., Personalized Query Expansion for the Web—Published Date: Jul. 27, 2007 http://delivery.acm.org/10.1145/1280000/1277746/p7-chirita.pdf?key1=1277746&key2=8684409521&coll=GUIDE&dl=GUIDE&CFID=63203797&CFTOKEN=28379565.

Kules, Bill, et al., Categorizing Web Search Results into Meaningful and Stable Categories Using Fast-Feature Techniques—Published Date: Jun. 15, 2006 http://hcil.cs.umd.edu/trs/2006-15/2006-15.pdf.

Bade, Korinna, et al., CARSA—An Architecture for the Development of Context Adaptive Retrieval Systems—Published Date: Feb. 14, 2006 http://www.springerlink.com/content/jk3wj13251rh6581/fulltext.pdf.

Budanitsky, et al., "Semantics Distance in Wordnet: an experimental, application-oriented evaluation of five measures" workshop of wordnet and other lexical resources, in the north american chapter of the association for computation linguistics, Jun. 2001, Pittsburgh, PA http://citeseer.ist.psu.edu/budanitskyo1semantic.html.

"Fisher, Brian, et al., ""CZWeb: Fish-Eye Views for Visualizing the World-Wide Web""", Published 1997, 5 pages, http://scholar.google.co.in/scholar?cluster=3988401955906218135&hl=en&as_sdt=2000".

Gonen, Bilal, "Semantic Browser", Aug. 2006, 42 pages, University of Georgia, Athens, Georgia, http://citeseerx.ist.psu.edu/viewdoc/download?doi=10.1.1.83.9132&rep=rep1&type=pdf.

Hao Liang, et al., "Translating Query for Deep Web Using Ontology", 2008 International Conference on Computer Science and Software Engineering, IEEE Computer Society, Published Date: 2008, http://ieeexplore.ieee.org/stamp/stamp.jsp?arnumber=04722650.

Havre, Susan, et al., "Interactive Visualization of Multiple Query Results," 2001, 8 pages, http://citeseerx.ist.psu.edu/viewdoc/download?doi=10.1.1.91.2850&rep=rep1&type=pdf.

Hearst, Marti A., "Ch. 10, Information Visualization for Search Interfaces", 2009, 69 pages, Search User Interfaces, http://searchuserinterfaces.com/book/sui_ch10_visualization.html.

International Search Report and Written Opinion PCT/US2011/021596, mailed Aug. 29, 2011.

International Search Report and Written Opinion PCT/US2011/021597, mailed Sep. 23, 2011.

Jonker, David, et al., "Information Triage with TRIST", May 2005, 6 pages, 2005 Intelligence Analysis Conference, Washington DC, Oculus Info, Inc., http://www.oculusinfo.com/papers/Oculus_TRIST_Final_Distrib.pdf.

Kiryakov, et al., "Semantic Annotation, Indexing, and Retrieval" Web Semantics: Science, Services and Agents on the World Wide Web, Elsevier, vol. 2, No. 1, Dec. 1, 2004, pp. 49-79.

Kosara, Robert, et al., "An Interaction View on Information Visualization", 2003, 15 pages, The Eurographics Association, http://www.cs.uta.fi/~jt68641/infoviz/An_Interaction_View_on_Information_Visualization.pdf.

Leopold, Jennifer, et al., "A Generic, Functionally Comprehensive Approach to Maintaining an Ontology as a Relational Database", 2009, pp. 369-379, World Academy of Science, vol. 52, http://www.akademik.unsri.ac.id/download/journal/files/waset/v52-58-oaj-unsri.pdf.

Mateevitsi, Victor, et al., "Sparklers: An Interactive Visualization and Implementation of the Netflix recommendation algorithm", retrieved Apr. 7, 2010, 5 pages, http://www.vmateevitsi.com/bloptop/.

Nguyen, Tien N., "A Novel Visualization Model for Web Search Results," Sep./Oct. 2006, pp. 981-988, IEEE Transactions on Visualization and Computer Graphics, vol. 12, No. 5, http://ieeexplore.ieee.org/stamp/stamp.jsp?tp=&arnumber=4015455.

Roberts, Jonathan C., et al.,"Visual Bracketing for Web Search Result Visualization", 2003, 6 pages, Seventh International Conference on Information Visualization, IEEE Computer Society,http://ieeexplore.ieee.org/stamp/stamp.jsp?tp=&arnumber=1217989.

"Smith, Kate A., et al., ""Web Page Clustering using a Self-Organizing Map of User Navigation Patterns""", Published 2003, pp. 245-256, Decision Support Systems, vol. 35, Elsevier Science, http://citeseerx.ist.psu.edu/viewdoc/download?doi=10.1.1.4.5185&rep=rep1&type=pdf".

"Smith, Michael P., et al., ""Providing a User Customisable Tool for Software Visualisation at Runtime,""" Published 2004, 6 pages, University of Durham, United Kingdom, http://citeseerx.ist.psu.edu/viewdoc/download?doi=10.1.1.60.4013&rep=rep1&type=pdf".

"Thomas Strang, Claudia Linnhoff-Popien, and Korbinian Frank, ""CoOL: A Context Ontology Languageto enable Contextual Interoperability""", IFIP International Federation for Information Processing, Published Date: 2003, http://citeseerx.ist.psu.edu/viewdoc/download;jsessionid=BC65BEE5025FB518404 AF16988E46489?doi=10.1.1.5.9505&rep=rep1&type=pdf."

Tony Veale and Yanfen Hao, "A context-sensitive framework for lexical ontologies", The Knowledge Engineering Review, vol. 23:1, 101-115, Cambridge University Press, Published Date: 2007, United Kingdom, http://afflatus.ucd.ie/Papers/ContextAndLexicalOntologies.pdf.

(56) References Cited

OTHER PUBLICATIONS

"Tvarozek, Michal, et a., "Improving Semantic Search via Integrated Personalized Faceted and Visual Graph Navigation", Published Date: 2008, 12 pages, http://www2.fiit.stuba.sk/~bielik/publ/abstracts/2008/sofsem2008navigation.pdf".
"Yngve, Gary, ""Visualization for Biological Models, Simulation, and Ontologies"", Published Aug. 2007, 152 pages, University of Washington, http://sigpubs.biostr.washington.edu/archive/00000232/01/gary-thesis-final.pdf".
Search Report Cited in PCT/US2011/0212 mailed Aug. 19, 2011.
Non Final Office Action in U.S. Appl. No. 12/700,985 mailed Dec. 12, 2011.
Non Final Office Action in U.S. Appl. No. 12/701,330 mailed Dec. 21, 2011.
Non Final Office Action in U.S. Appl. No. 12/727,836, mailed Jan. 6, 2012.
Final Office Action, U.S. Appl. No. 12/795,238—mailed Dec. 11, 2012.
Non Final Office Action, mailed Mar. 26, 2012, in U.S. Appl. No. 12/796,753.
Final Office Action, mailed Aug. 6, 2012, in U.S. Appl. No. 12/796,753.
Notice of Allowance, mailed Aug. 24, 2012, in U.S. Appl. No. 13/406,941.
Notice of Allowance in U.S. Appl. No. 13/406,941, mailed Jul. 30, 2012.
Non Final Office Action in U.S. Appl. No. 12/797,375, mailed Sep. 13, 2012.
Non-Final Office Action mailed Mar. 27, 2013 in U.S. Appl. No. 13/569,460, 25 pages.
Final Office Action mailed Jun. 5, 2013 in U.S. Appl. No. 12/797,375 13 pages.
China 1st Office Action dated Jun. 7, 2013 in CN Application No. 201180008397.3, 5 pages.
China State Intellectual Property Office Search Report dated May 30, 2013 in CN Application 201180008397.3, 2 pages.
Final Office Action in U.S. Appl. No. 12/727,836 mailed Apr. 16, 2012, 14 pages.
Final Office Action in U.S. Appl. No. 12/700,985, mailed Apr. 6, 2012, 24 pages.
Notice of Allowance in U.S. Appl. No. 12/701,330, mailed Jun. 21, 2012.
NonFinal Office Action in U.S. Appl. No. 12/795,238 mailed Jul. 5, 2012, pp. 1-16.
Chris Halaschek, Boanerges Aleman-Meza, I. Budak Arpinar, and Amit P. Sheth, 2004, Discovering and ranking Semantic Associations Over a Large RDF Metabase. In Proceedings of the Thirtieth International conference on Very large data bases—vol. 30 (VLDB '04), vol. 30. VLDB Endowment, pp. 1317-1320.
Non Final OA mailed Jan. 10, 2014 in U.S. Appl. No. 12/727,836.
Non Final OA mailed Jan. 27, 2014 in U.S. Appl. No. 12/796,753.
Non Final OA mailed Dec. 30, 2013 in U.S. Appl. No. 12/797,375.
Non Final Office Action, mailed Nov. 1, 2013, in U.S. Appl. No. 12/795,238.
Final Office Action mailed Sep. 9, 2013 in U.S. Appl. No. 13/569,460.
First OA mailed Oct. 29, 2013 in CN Application No. 201180008423.2.
Chinese Office Action mailed Feb. 24, 2014 in CN Application No. 201180008397.3.
Chinese Office Action mailed Feb. 18, 2014 in CN Application No. 201180008411.X.
Australian Office Action mailed Feb. 21, 2014 in AU Application No. 2011213263.
Non-Final Office Action mailed Jun. 10, 2014 in U.S. Appl. No. 12/700,985, 29 pages.
Final Office Action dated May 30, 2014 re U.S. Appl. No. 12/796,753, 29 pages.
Japanese Office Action dated Jun. 10, 2014 in Application No. 2012-551987, 7 pages.
Final Office Action mailed Apr. 28, 2014 in U.S. Appl. No. 12/727,836, 22 pages.
Final Office Action mailed Apr. 23, 2014 in U.S. Appl. No. 12/795,238, 37 pages.
Australian Office Action dated Apr. 15, 2014 with Search Information Statement (SIS) dated Apr. 10, 2014 in Application No. 2011213263, 5 pages.
Chinese Office Action mailed Apr. 3, 2014 in Application No. 201180008423.2, 4 pages.
Chinese Office Action mailed May 19, 2014 in Application No. 201180008427.0, 9 pages.
Chinese Search Report dated Apr. 8, 2014 in Application No. 201180008427.0, 2 pages.
Final Office Action dated Jul. 16, 2014 in U.S. Appl. No. 12/797,375, 22 pages.
Chinese Search Report dated Aug. 4, 2014 in Application No. 201180008397.3, 2 pages.
Chinese Office Action dated Aug. 12, 2014 in Application No. 201180008397.3, 3 pages.
Non-Final Office Action dated Sep. 11, 2014 in U.S. Appl. No. 12/727,836, 13 pages.
Non-Final Office Action dated Sep. 24, 2014 in U.S. Appl. No. 12/796,753, 30 pages.
Kwok et al., "Scaling Question Answering to the Web," University of Washington, Nov. 13, 2000; 21 pages.

\* cited by examiner

GENERATING AND PRESENTING LATERAL CONCEPTS

This application is related by subject matter to the invention described in U.S. application Ser. No. 12/701,330, filed 5 Feb. 2010, and entitled "Semantic Advertising Selection From Lateral Concepts and Topics;" which is assigned or under obligation of assignment to the same entity as this application, and incorporated in this application by reference.

BACKGROUND

Conventionally, a user receives query formulation assistance from a local application or a remote server that provides cached terms based on queries previously received by conventional search engines from the user or other users that submit queries to the conventional search engines.

Conventional search engines receive queries from users to locate web pages having terms that match the terms included in the received queries. Conventional search engines assist a user with query formulation by caching terms sent to the conventional search engines from all users of the conventional search engines on servers that are remote from the users and displaying one or more of the cached terms to a user that is entering a user query for the conventional search engines. The user selects any one of the cached terms to complete the query and receives a listing of web pages having terms that match the terms included in the user query.

SUMMARY

Embodiments of the invention relate to systems, methods, and computer-readable media for presenting and generating lateral concepts in response to a query from a user. The lateral concepts are presented in addition to search results that match the user query. A search engine receives a query from a client device. In turn, storage is searched to locate a match to the query. If a match exists, content corresponding to the query is retrieved by a lateral concept generator from the storage. In turn, categories associated with the content are identified by the lateral concept generator. The lateral concept generator also obtains additional content associated with each category. A comparison between the retrieved content and the additional content is performed by the lateral concept generator to assign scores to each identified category. The lateral concept generator selects several categories based on scores assigned to content corresponding to each category and returns the retrieved content and several categories as lateral concepts. If a match does not exist, the lateral concept generator compares content stored in the storage to the query to create a content collection that is used to identify categories and calculate scores based on similarity between the query and content in the content collection.

This summary is provided to introduce a selection of concepts in a simplified form that are further described below in the detailed description. This summary is not intended to identify key features or essential features of the claimed subject matter, nor is it intended to be used as an aid in isolation to determine the scope of the claimed subject matter.

BRIEF DESCRIPTION OF THE DRAWINGS

Illustrative embodiments of the invention are described in detail below with reference to the attached drawing figures, which are incorporated by reference herein, wherein.

DETAILED DESCRIPTION

This patent describes the subject matter for patenting with specificity to meet statutory requirements. However, the description itself is not intended to limit the scope of this patent. Rather, the inventors have contemplated that the claimed subject matter might also be embodied in other ways, to include different steps or combinations of steps similar to the ones described in this patent, in conjunction with other present or future technologies. Moreover, although the terms "step" and "block" may be used herein to connote different elements of methods employed, the terms should not be interpreted as implying any particular order among or between various steps herein disclosed unless and except when the order of individual steps is explicitly described.

As used herein, the term "lateral concept" refers to words or phrases that represent orthogonal topics of a query.

As used herein the term "component" refers to any combination of hardware, firmware, and software.

Embodiments of the invention provide lateral concepts that allow a user to navigate a large collection of content having structured data, semistructured data, and unstructured data. The computer system generates lateral concepts by processing the collection of content matching a query provided by the user and selecting categories for the content. The lateral concepts comprise a subset of the selected categories. The lateral concepts are presented to user along with search results match the query. The lateral concepts allow the search engine to provide concepts that are orthogonal to a query or content corresponding to the query. In turn, the user may select one of the lateral concepts to search the combination of structured, unstructured, and semistructured data for content corresponding to the lateral concepts. In an embodiment, the lateral concepts may be stored in an index with a pointer to one or more queries received from a user. Accordingly, the lateral concepts may be returned in response to subsequent queries—similar to previous queries—received at a search engine included in the computer system without processing the content.

For instance, a search engine may receive a query for Seattle Space Needle from a user. The search engine processes the query to identify lateral concepts and search results. The lateral concepts may be selected from the structure of metadata stored with content for Seattle Space Needle. Or the lateral concepts may be selected from feature vectors generated by parsing search results associated with the user query.

The storage structure may include metadata, e.g., content attributes for the Seattle Space Needle. The Seattle Space Needle content attributes may include a tower attribute, a Seattle attraction attribute, and an architecture attribute. The tower attribute may include data that specifies the name and height of the Seattle Space Needle and other towers, such as Taipei 101, Empire State Building, Burj, and Shanghai World Financial Center. The Seattle attraction attribute may include data for the name and location of other attractions in Seattle, such as Seattle Space Needle, Pike Place Market, Seattle Art Museum, and Capitol Hill. The architecture attribute may include data for the architecture type, modern, ancient, etc., for each tower included in the tower attribute. Any of the Seattle Space Needle content attributes may be returned as a lateral concept by the search engine.

Alternatively, the search results may be processed by a computer system to generate lateral concepts that are returned with the search results. The content associated with the search results is parsed to identify feature vectors. The feature vectors include a category element that is associated with the content. The feature vectors are used to compare the search results and calculate a similarity score between the search results or between the search results and the query. The categories in the feature vectors are selected by the computer system based on the similarity score and returned as lateral concepts in response to the user query.

The computer system that generates the lateral concepts may include storage devices, a search engine, and additional computing devices. The search engine receives queries from the user and returns results that include content and lateral concepts. The storage is configured to store the content and the lateral concepts. In some embodiments, the content includes a collection of structured, unstructured, and semi-structured data.

Figure 1:
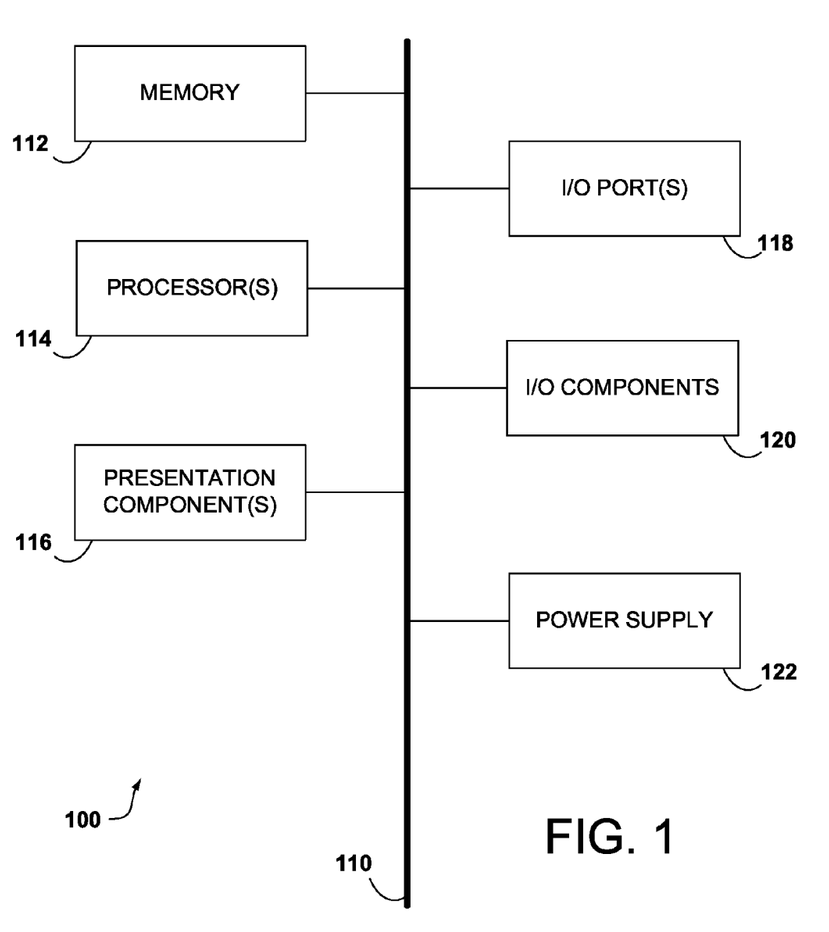
FIG. 1 is a block diagram illustrating an exemplary computing device in accordance with embodiments of the invention.

FIG. 1 is a block diagram illustrating an exemplary computing device 100 in accordance with embodiments of the invention. The computing device 100 includes bus 110, memory 112, processors 114, presentation components 116, input/output (I/O) ports 118, input/output (I/O) components 120, and a power supply 122. The computing device 100 is but one example of a suitable computing environment and is not intended to suggest any limitation as to the scope of use or functionality of the invention. Neither should the computing device 100 be interpreted as having any dependency or requirement relating to any one or combination of components illustrated.

The computing device 100 typically includes a variety of computer-readable media. By way of example, and not limitation, computer-readable media may comprise Random Access Memory (RAM); Read Only Memory (ROM); Electronically Erasable Programmable Read Only Memory (EEPROM); flash memory or other memory technologies; CDROM, digital versatile disks (DVD) or other optical or holographic media; magnetic cassettes, magnetic tape, magnetic disk storage or other magnetic storage devices, or any other medium that may be used to encode desired information and be accessed by the computing device 100. Embodiments of the invention may be implemented using computer code or machine-useable instructions, including computer-executable instructions such as program modules, being executed by a computing device 100, such as a personal data assistant or other handheld device. Generally, program modules including routines, programs, objects, modules, data structures, and the like, refer to code that performs particular tasks or implements particular abstract data types. Embodiments of the invention may be practiced in a variety of system configurations, including distributed computing environments where tasks are performed by remote-processing devices that are linked through a communications network.

The computing device 100 includes a bus 110 that directly or indirectly couples the following components: a memory 112, one or more processors 114, one or more presentation modules 116, input/output (I/O) ports 118, I/O components 120, and an illustrative power supply 122. The bus 110 represents what may be one or more busses (such as an address bus, data bus, or combination thereof). Although the various components of FIG. 1 are shown with lines for the sake of clarity, in reality, delineating various modules is not so clear, and metaphorically, the lines would more accurately be grey and fuzzy. For example, one may consider a presentation component 116 such as a display device to be an I/O component. Also, processors 114 have memory 112. Distinction is not made between "workstation," "server," "laptop," "handheld device," etc., as all are contemplated within the scope of FIG. 1.

The memory 112 includes computer-readable media and computer-storage media in the form of volatile and/or nonvolatile memory. The memory may be removable, nonremovable, or a combination thereof. Exemplary hardware devices include solid-state memory, hard drives, optical-disc drives, etc. The computing device 100 includes one or more processors 114 that read data from various entities such as the memory 112 or I/O components 120. The presentation components 116 present data indications to a user or other device. Exemplary presentation components 116 include a display device, speaker, printer, vibrating module, and the like. The I/O ports 118 allow the computing device 100 to be physically and logically coupled to other devices including the I/O components 120, some of which may be built in. Illustrative I/O components 120 include a microphone, joystick, game pad, satellite dish, scanner, printer, wireless device, and the like.

A computer system that generates lateral concepts includes a search engine, storage, and a lateral concept generator. The lateral concepts may be stored in storage along with content and queries that are related to the content. The search engine receives the query and transmits lateral concepts and results that include content corresponding to the query to a client device. The client device displays the results along with a list of at least some of the lateral concepts.

Figure 2:
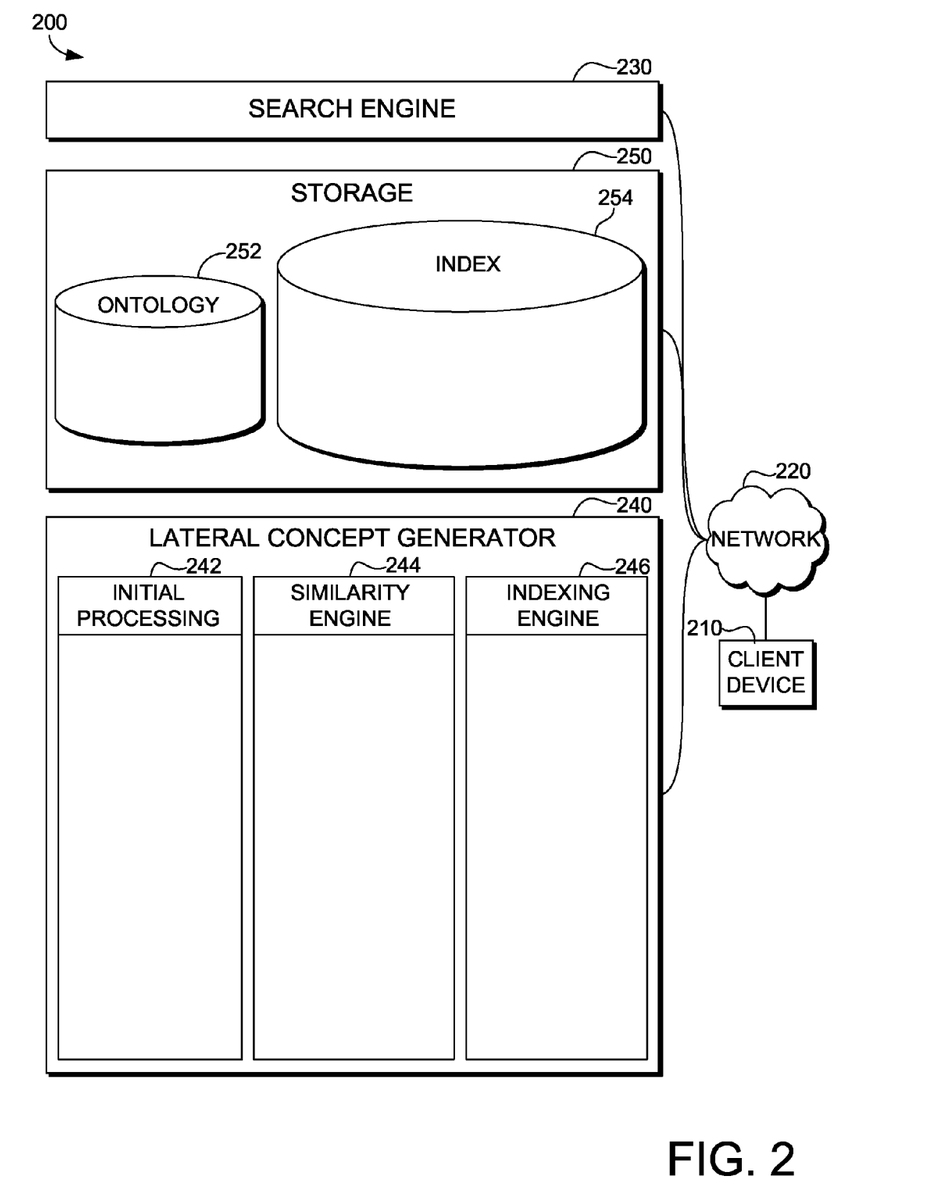
FIG. 2 is a network diagram illustrating exemplary components of a computer system configured to generate lateral concepts in accordance with embodiments of the invention.

FIG. 2 is a network diagram illustrating exemplary components of a computer system 200 configured to generate lateral concepts in accordance with embodiments of the invention. The computer system 200 has a client device 210, a network 220, search engine 230, lateral concept generator 240, and storage 250.

The client device 210 is connected to the search engine 230 via network 220. The client device 210 allows a user to enter queries. The client device 210 transmits the queries to the search engine 230. In turn, the client device 210 receives results that include lateral concepts and displays the results and lateral concepts to the users. In some embodiments, the client device 210 may be any computing device that is capable of web accessibility. As such, the client device 210 might take on a variety of forms, such as a personal computer (PC), a laptop computer, a mobile phone, a personal digital assistance (PDA), a server, a CD player, an MP3 player, a video player, a handheld communications device, a workstation, any combination of these delineated devices, or any other device that is capable of web accessibility.

The network 220 connects the client device 210, search engine 230, lateral concept generator 240, and storage 250. The network 220 may be wired, wireless, or both. The network 220 may include multiple networks, or a network of networks. For example, the network 220 may include one or more wide area networks (WANs), one or more local area networks (LANs), one or more public networks, such as the Internet, or one or more private networks. In a wireless network, components such as a base station, a communications tower, or even access points (as well as other components) may provide wireless connectivity in some embodiments. Although single components are illustrated for the sake of clarity, one skilled in the art will appreciate that the network 220 may enable communication between any number of client devices 210.

The search engine 230 is a server computer that provides results for queries received from client devices 210. In some embodiments, the search engine 230 provides lateral concepts in response to the queries. The search engine 230 may return some number, e.g., the top three, lateral concepts for each query received from the client devices 210. The search engine 230 may receive the lateral concepts from the lateral concept generator 240 or storage 250.

The lateral concept generator 240 generates lateral concepts in response to a query. In one embodiment, the lateral concept generator 240 includes an initial processing component 242, a similarity engine 244, and an indexing engine 246. The lateral concept generator 240 receives categories and content from storage 250. In turn, the content and categories are processed by one or more components 242, 244, and 246 of the lateral concept generator 240.

The initial processing component 242 is configured to locate content that matches the query received by the search engine 230, to analyze the content, and extract information using one or more data processing methods. In this regard, the initial processing component 242 may be used to analyze content and extract information from the three types of data: unstructured data, structured data, and semistructured data. Unstructured data may comprise documents with a series of text lines. Documents that are included in the category of unstructured data may have little or no metadata. Structured data, on the other hand, may comprise a traditional database where information is structured and referenced. Semistructured data may comprise a document such as a research paper or a Security and Exchange Commission filing, where part of the document comprises lines of text and part of the document comprises tables and graphs used for illustration. In the case of semistructured data, the structured components of a document may be analyzed as structured data and the unstructured components of the documents may be analyzed as unstructured data.

Feature vectors are used to compare content matching the query. The feature vectors may include the following elements: a group of words, a concept, and score. The group of words represent a summary or sampling of the content. The concept categorizes the content. And the score contains a similarity measure for the content and additional content matching the query. For instance, a feature vector for Space Needle content may include a group of words "monument built for world fair" a concept "tower" and a score "null." The concepts element of the feature vectors may be selected as the lateral concept based on the score assigned to the feature vector.

The values for the elements of the feature vector may be generated manually or automatically. A subject matter expert may manually populate the elements of the feature vector. Alternatively, the elements of the feature vector may be populated automatically by the lateral concept generator 240.

The initial processing component 242 may include a lexical analysis, a linguistic analysis, an entity extraction analysis, and attribute extraction analysis. In an embodiment, the initial processing component 242 creates feature vectors for the content in storage 250. The initial processing component 242 automatically populates the words and concepts for feature vectors. In certain embodiments, the initial processing component 242 selects the concepts from the ontologies 252 in storage 250, or from the words extracted from the content.

The similarity engine 244 calculates a similarity score that populates the score element for the feature vector. The similarity engine 244 is a component of the lateral concept generator 240. The similarity engine calculates a similarity score that is stored in the feature vector for the content retrieved from storage 250. The score may represent similarity to other content, in storage 250, matching the query or similarity to the query received by the search engine 230. In turn, the similarity score is used to select several categories from concepts identified in the feature vectors associated with the content matching the query. The selected categories are returned to the search engine 230 as lateral concepts.

In one embodiment, the similarity engine 244 may calculate similarity between content matching the query using the feature vectors. The similarity score may be calculated based on distance between the feature vectors using the Pythagorean theorem for multidimensional vectors. For instance, when the storage 250 includes content matching the query, the lateral concept generator 240 may return several categories based on scores assigned to content within each of the several categories. The lateral concept generator 240 obtains the matching content and corresponding categories from storage 250. In turn, the lateral concept generator 240 generates the feature vector for the matching content. Also, the lateral concept generator 240 generates a content collection using the categories associated with the matching content. Each content in the content collection is processed by the lateral concept generator 240 to create feature vectors. In turn, each feature vector for the content collection is compared to the feature vector for the matching content to generate a similarity score. In turn, the feature vectors for the content collection are updated with similarity scores calculated by the similarity engine 244. The similarity engine 244 may select a number of feature vectors with high similarity scores in each category, average the scores, and assign the category the averaged score. In an embodiment, the similarity engine 244 selects three feature vectors within each category assigned the highest score to calculate the average score that is assigned to the categories. Thus, as an example, the top five categories with the highest scores may be returned to the search engine 230 as lateral concepts.

In another embodiment, the similarity engine 244 may calculate similarity between content and the query. The similarity score may be calculated based on distance between the feature vectors using the Pythagorean theorem for multidimensional vectors. For instance, when the storage 250 does not include content matching the query, the lateral concept generator 240 may return several categories based on scores assigned to content within each of the several categories. The lateral concept generator 240 obtains a predetermined number of content related to the query and corresponding categories from storage 250. In one embodiment, the lateral concept generator obtains fifty items of content from storage 250 having a high query similarity score. In turn, the lateral concept generator 240 generates a feature vector for the query. Also, the lateral concept generator 240 retrieves a collection of content using the categories associated with the obtained content. Content in the collection of content is processed by the lateral concept generator 240 to create feature vectors. In turn, the feature vectors for content in the collection of content is compared to the feature vector for the query to generate a similarity score. In turn, the feature vectors for the content collection are updated with similarity scores calculated by the similarity engine 244. The similarity engine 244 may select a number of feature vectors with high similarity scores in each category, average the scores, and assign the category the averaged score. In an embodiment, the similarity engine 244 selects three feature vectors within each category assigned the highest score to calculate the average score that is assigned to the categories. In turn, the top five categories with the highest scores are returned to the search engine as lateral concepts.

The similarity engine 244 may use word frequency to calculate a query similarity score for the content in storage 250. The query similarity score ($S_q$) is calculated by the similarity engine when a match to the query is not stored in the storage 250. $S_q=\sqrt{freq(w) \times \log(docfreq(w))}$, where freq (w) is the frequency of the query (w) in the storage and docfreq is the frequency of the query within the content that is selected for comparison. The content assigned the largest $S_q$ are collected by the similarity engine 244, and the top fifty documents are used to generate the lateral concepts.

The indexing engine 246 is an optional component of the lateral concept generator 240. The indexing engine 246 receives the lateral concepts from the similarity engine 244 and stores the lateral concepts in index 254 along with the query that generates the lateral concept. In turn, a subsequent query similar to a previously processed query may bypass the lateral concept generator 240 and obtain the lateral concepts stored in the index 254.

The storage 250 provides content and previously generated lateral concepts to the search engine 230. The storage 250 stores content, ontologies 252, and an index 254. In certain embodiments, the storage 250 also includes one or more data stores, such as relational and/or flat file databases and the like, that store a subject, object, and predicate for each content. The index 254 references content along with previously generated lateral concepts. The content may include structured, semistructured, and unstructured data. In some embodiments, the content may include video, audio, documents, tables, and images having attributes that are stored in the flat file databases. The computer system 200 may algorithmically generate the lateral concepts, or content attributes may be used as lateral concepts.

For instance, content attributes for the Seattle Space Needle or of a particular stock may be stored in storage 250. The content attributes may be provided as lateral concepts in response to a search query for the Seattle Space Needle or the particular stock, respectively. The Seattle Space Needle content attributes may include a tower attribute, a Seattle attraction attribute, and an architecture attribute. The tower attribute may include data that specifies the name and height of the Seattle Space Needle and other towers, such as Taipei 101, Empire State Building, Burj, and Shanghai World Financial Center. The Seattle attraction attribute may include data for the name and location of other attractions in Seattle, such as Seattle Space Needle, Pike Place Market, Seattle Art Museum, and Capitol Hill. The architecture attribute may include data for the architecture type, modern, ancient, etc., for each tower included in the tower attribute. Any of the Seattle Space Needle content attributes may be returned as a lateral concept by the computer system 200.

The particular stock may also include stock content attributes. For instance, MSFT content attributes may include a type attribute, an industry attribute, and a profit to earnings (PE) attribute. The type attribute includes data for business type, e.g., corporation, company, incorporated, etc. The industry attribute, may specify the industry, e.g., food, entertainment, software, etc., and the PE attribute includes the value of the PE. Any of the stock content attributes may be returned as a lateral concept by the computer system 200.

The lateral concepts that are generated algorithmically by the computer system 200 may be stored in the index 254. In turn, subsequent queries received by the search engine 230 that match feature vectors in storage 250 may be responded to, in certain embodiments, with the lateral concepts stored in the index 254. For a given query, the index 254 may store several lateral concepts. Accordingly, the search engine 230 may access the index 254 to obtain a list of lateral concepts. The lateral concepts enable a user to navigate content in the storage 250.

The ontologies 252 include words or phrases that correspond to content in storage 250. The categories associated with content in storage 250 may be selected from multiple ontologies 252. Each ontology 252 includes a taxonomy for a domain and the relationship between words or phrases in the domain. The taxonomy specifies the relationship between the words or phrases in a domain. The domains may include medicine, art, computers, etc. In turn, the categories associated with the content may be assigned a score by the lateral concept generator 240 based on similarity. In one embodiment, the lateral concept generator 240 calculates the score based on similarity to content obtained in response to the query. In another embodiment, the lateral concept generator 240 calculates the score based on similarity to the query. The lateral concept generator 240 selects several categories as lateral concepts based on the score.

In some embodiments, one or more lateral concepts stored in an index are transmitted to a client device for presentation to a user in response to a query from the user. Alternatively, the lateral concepts may be dynamically generated based on the query received from the user. The computer system may execute at least two computer-implemented methods for dynamically generating lateral concepts. In a first embodiment, the lateral concepts are selected based on scores between feature vectors of content matching the query and other content in storage.

Figure 3:
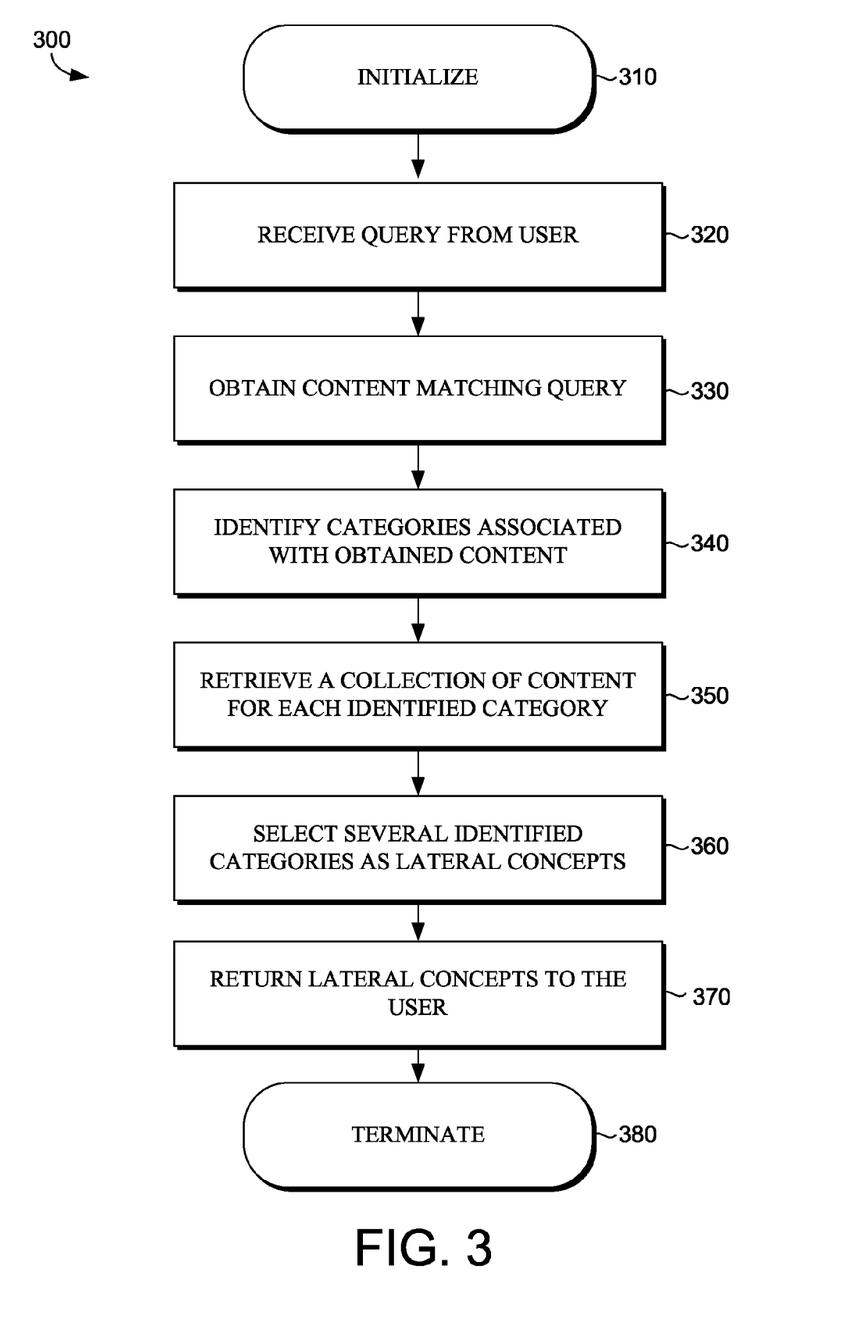
FIG. 3 is a logic diagram illustrating a computer-implemented method for generating lateral concepts in accordance with embodiments of the invention.

FIG. 3 is a logic diagram illustrating a computer-implemented method for generating lateral concepts in accordance with embodiments of the invention. The method initializes in step 310 when the computer system is connected to a network of client devices.

In step 320, the computer system receives a user query. In turn, the computer system obtains content that corresponds to the user query from storage, in step 330. In step 340, the computer system identifies categories associated with the obtained content corresponding to the user query. In one embodiment, the categories include phrases in one or more ontologies. In another embodiment, the categories comprise attributes of the obtained content corresponding to the user query. In turn, the computer system retrieves, from storage a collection of content that corresponds to each identified category, in step 350.

In step 360, the computer system selects several identified categories as lateral concepts based on scores assigned to content in the collection of content. In one embodiment, the lateral concepts may include orthogonal concepts. The lateral concepts may be stored in the storage of the computer system.

In certain embodiments, the content is represented as feature vectors. And the score is assigned to the content based on similarity between feature vectors. The computer system displays the lateral concepts to the user that provided the user query. Also, content displayed with the lateral concepts may be filtered by the computer system based on the similarity score assigned to the content. In an embodiment, the computer system displays the top three lateral concepts.

The computer system may select, in some embodiments, orthogonal concepts by identifying the normal to a plane corresponding to the feature vector of the obtained content. In turn, feature vectors for the collection of content that create planes, which are parallel to a plane created by the normal, are processed by the computer system to obtain categories of the content associated with those feature vectors. In step 370, several of these categories may be returned as lateral concepts based on a score assigned to the content within the categories. The method terminates in step 380.

As mentioned above, the computer system may execute at least two computer-implemented methods for dynamically generating lateral concepts. In a second embodiment, the lateral concepts are selected based on scores between feature vectors for the query and content in storage. The computer system may execute this method when the storage does not contain a match to the query. In some embodiments, a match is determined without using stems for the terms included in the query. Thus, the storage of the computer system may include other matches that are based on the stems of the terms included in the query. These other matches may be used to generate the lateral concepts.

Figure 4:
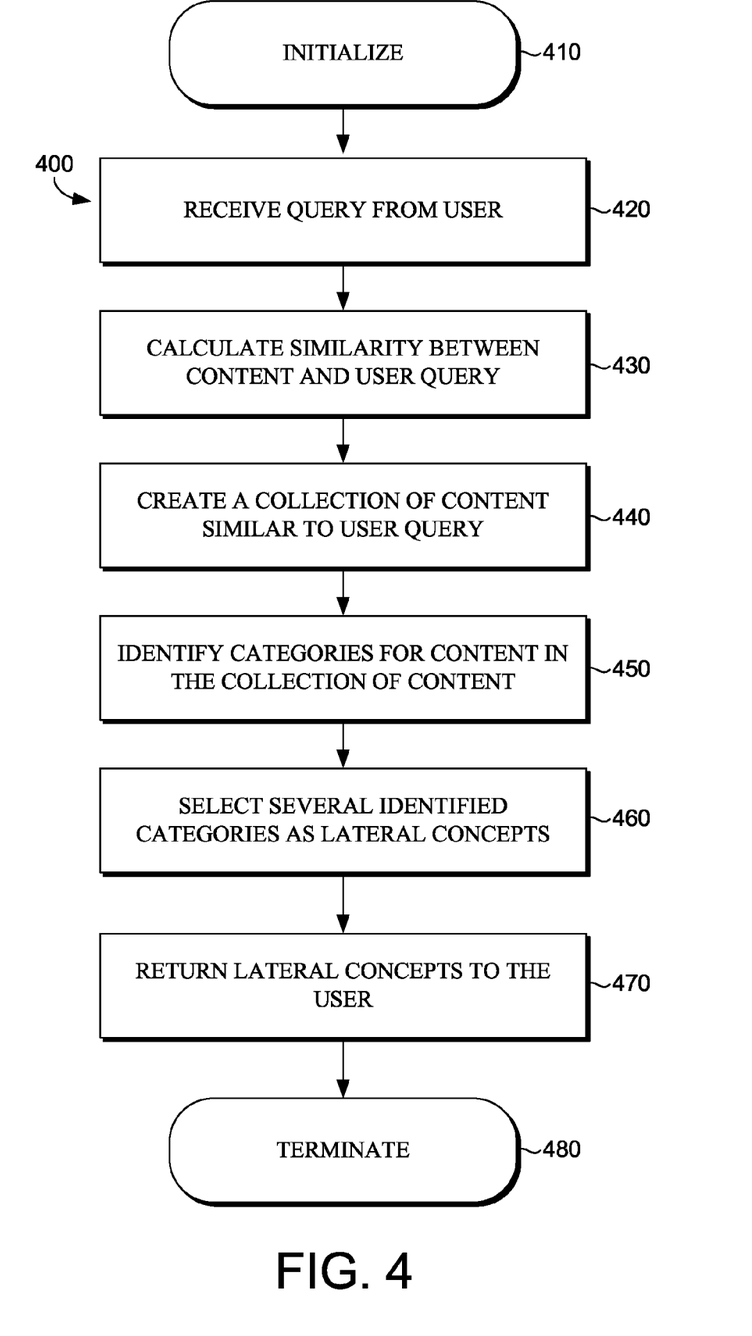
FIG. 4 is a logic diagram illustrating an alternative computer-implemented method for generating knowledge content in accordance with embodiments of the invention.

FIG. 4 is a logic diagram illustrating an alternative computer-implemented method for generating knowledge content in accordance with embodiments of the invention. The method initializes in step 410 when the computer system is connected to a network of client devices.

In step 420, the computer system receives a user query. In step 430, the computer system calculates similarity between content in storage and the user query. In step 440, the computer system creates a collection of content having a predetermined number of content similar to the user query. In turn, the computer system identifies each category that corresponds to content in the collection of content, in step 450. In step 460, the computer system selects several identified categories as lateral concepts based on scores assigned to content in the collection of content.

In certain embodiments, the query and content are represented as feature vectors. And the score is assigned to the content based on similarity between feature vectors for the query and content. The computer system displays the lateral concepts to the user that provided the user query. Also, content displayed with the lateral concepts may be filtered by the computer system based on the similarity score assigned to the content. In an embodiment, the computer system displays the top three lateral concepts. In one embodiment, orthogonal concepts may be included in the lateral concepts. The orthogonal concepts are selected by identifying the normal to a plane corresponding to the feature vector of the query. In turn, feature vectors for the collection of content that create planes, which are parallel to a plane created by the normal, are processed by the computer system to obtain categories of the content associated with those feature vectors. In step 470, several of these categories may be returned as lateral concepts based on a score assigned to the content within the categories. The method terminates in step 480.

In certain embodiments, the selected lateral concepts are displayed in a graphical user interface provided by a search engine. The lateral concepts are provided along with the search results that match the user query received by the search engine. The user may select the lateral concepts to issue queries to the search engine and retrieve additional content corresponding to the selected lateral concepts.

Figure 5:
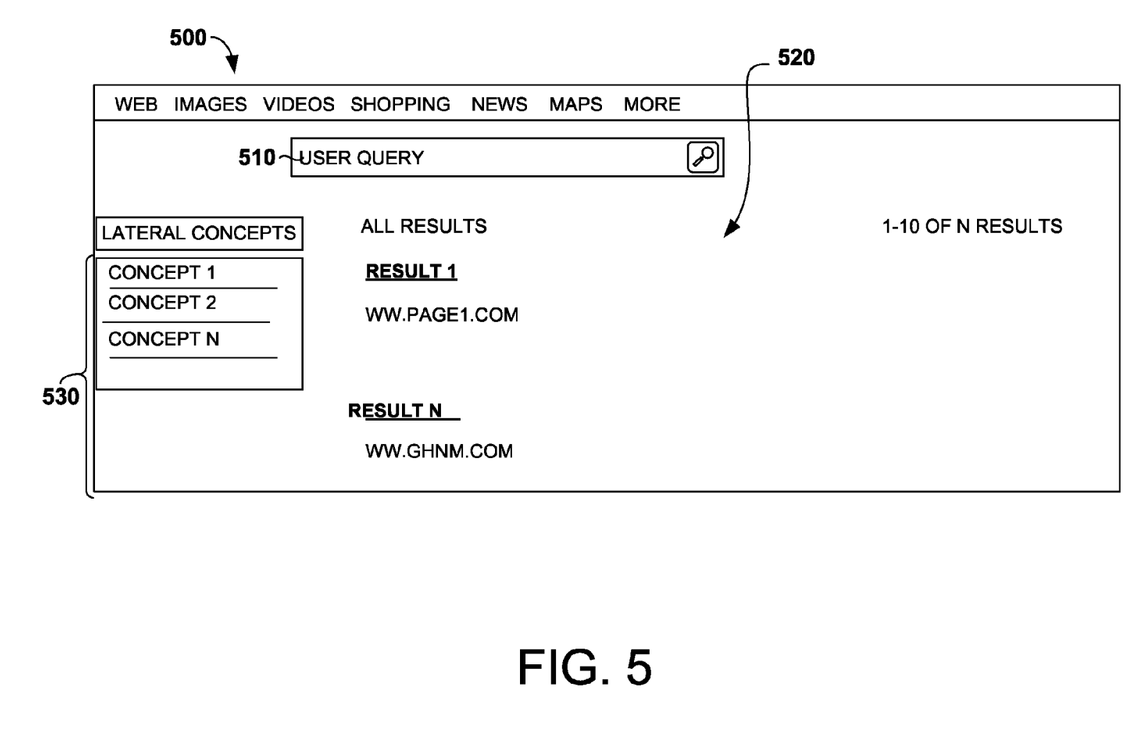
FIG. 5 is a graphical user interface illustrating lateral concepts returned in response to a user query in accordance with embodiments of the invention.

FIG. 5 is a graphical user interface 500 illustrating lateral concepts returned in response to a user query in accordance with embodiments of the invention. The graphical user interface includes a search text box 510, search results region 520, and lateral concepts region 530.

The graphical user interface 500 is displayed in response to a user query entered in the search text box 510. The user query is transmitted to the search engine after the user initiates the search. The search engine responds with a listing of results and the results are displayed in the search results region 520. The search engine also responds with lateral concepts. The lateral concepts are displayed in the lateral concepts regions 530. If a user selects a lateral concept from the lateral concepts regions 530, search results relevant to the selected lateral concept are displayed in the search results region 520.

In summary, lateral concepts allow a user to traverse unstructured, structured, and semistructured content using information derived from the content or the storage structure of the computer system storing the unstructured, structured, and semistructured content. A user may send a query to a search engine, which returns a number of results. In addition the search engine may also provide lateral concepts. The lateral concepts may correspond to one or more categories associated with content included in the search results. When the user clicks on the lateral concepts, the results are updated to include additional content associated with the lateral concepts.

Many different arrangements of the various components depicted, as well as components not shown, are possible without departing from the spirit and scope of the present invention. Embodiments of the present invention have been described with the intent to be illustrative rather than restrictive. It is understood that certain features and subcombinations are of utility and may be employed without reference to other features and subcombinations and are contemplated within the scope of the claims. Not all steps listed in the various figures need be carried out in the specific order described.

The invention claimed is:

1. A computer-implemented method for presenting a user with lateral concepts corresponding to a search query, the method further comprising:
 receiving a user query;
 obtaining a first set of content that corresponds to the user query from storage;
 extracting a plurality of categories from the obtained first set of content;
 selecting a subset of the plurality of identified categories as lateral concepts; and
 returning the first set of content and selected lateral concepts responsive to the user query.

2. The method of claim 1, wherein the categories include phrases.

3. The method of claim 1, wherein the categories comprise attributes of the content.

4. The method of claim 1, wherein the content is represented as a feature vector.

5. The method of claim 4, wherein a similarity score is assigned to the content based on similarity between feature vectors.

6. The method of claim 5, further comprising: displaying the lateral concepts to a user that provided the user query.

7. The method of claim 6, further comprising: filtering content displayed with the lateral concepts based on the similarity score assigned to the content.

8. The method of claim 1, further comprising: displaying the top three lateral concepts to a user that provided the user query.

9. The method of claim 1, further comprising: storing the lateral concepts in the storage.

10. The method of claim 1, wherein selecting a subset of the plurality of identified categories as lateral concepts further comprises: determining similarity between content matching the query and other content in storage and selecting categories extracted from the content with the greatest similarity; or determining similarity between content matching the query and the query and selecting categories extracted from the content with the greatest similarity.

11. One or more hardware computer-readable media storing computer-executable instructions for performing a method to generate lateral concepts, the method further comprising:
receiving a user query;
calculating similarity between content in storage and the user query;
creating a collection of content having a predetermined number of content similar to the user query;
identifying each category that corresponds to content in the collection of content, wherein the categories are extracted from the content in the collection of content; and
returning the collection of content and lateral concepts selected from the identified categories in response to the user query.

12. The media of claim 11, wherein the categories include phrases.

13. The media of claim 11, wherein the categories comprise attributes of the content.

14. The media of claim 11, wherein the content is represented as a feature vector.

15. The media of claim 14, wherein a score is assigned to the content based on similarity of the feature vectors to the user query.

16. The media of claim 14, further comprising: displaying the lateral concepts to a user that provided the user query.

17. The media of claim 16, further comprising: filtering content displayed with the lateral concepts based on the similarity score assigned to the content.

18. The media of claim 11, further comprising: storing the lateral concepts in the storage.

19. A computer system having processors and memories configured to generate lateral concepts, the system further comprising:
a search engine configured to receive user queries;
a storage configured to store content and corresponding categories; and
a lateral concept generator communicatively connected to the search engine and storage, wherein the lateral concept generator is configured to select lateral concepts from categories associated with content in storage based on similarity scores for the stored content, the categories are extracted from matching content stored in storage when the user query matches content stored in the storage and the search engine provides results to the user queries that include the generated lateral concepts, and the storage stores the generated lateral concepts corresponding to the user queries.

20. The computer system of claim 19, wherein categories are selected from a collection of content similar to the user query when the user query does not have a match in the storage without stemming the query.

* * * * *